(12) United States Patent
Sayre et al.

(10) Patent No.: US 9,591,371 B1
(45) Date of Patent: Mar. 7, 2017

(54) MOVING COLOR TEST PATTERN

(75) Inventors: Rick Sayre, Kensington, CA (US); Rod Bogart, San Rafael, CA (US)

(73) Assignee: PIXAR, Emeryville, CA (US)

( * ) Notice: Subject to any disclaimer, the term of this patent is extended or adjusted under 35 U.S.C. 154(b) by 2140 days.

(21) Appl. No.: 11/978,046

(22) Filed: Oct. 25, 2007

(51) Int. Cl.
*H04N 17/00* (2006.01)
*H04N 21/485* (2011.01)

(52) U.S. Cl.
CPC .............................. *H04N 21/4854* (2013.01)

(58) Field of Classification Search
USPC ........................................ 348/181, 182, 180
See application file for complete search history.

(56) References Cited

U.S. PATENT DOCUMENTS

| | | | | |
|---|---|---|---|---|
| 5,671,011 A * | 9/1997 | Kim | ...................... | H04N 17/04 348/181 |
| 5,731,839 A * | 3/1998 | Panaro | ................... | H04N 19/61 348/180 |
| 6,330,040 B1 * | 12/2001 | Kawashima | ............. | H04N 9/28 348/181 |
| 6,552,755 B1 * | 4/2003 | Kim | ...................... | H04N 17/02 315/368.11 |
| 2007/0195169 A1 * | 8/2007 | Shiokawa | ............. | G06T 7/0004 348/207.2 |

OTHER PUBLICATIONS

"THX Optimizer: Color and Tint Setup," printed on Sep. 7, 2007 from website http://www.thx.com/home/dvd/optimizer/colorTint.html (2 pages).

* cited by examiner

*Primary Examiner* — Michael Hong
(74) *Attorney, Agent, or Firm* — Kilpatrick Townsend & Stockton LLP

(57) ABSTRACT

Test patterns and associated techniques for testing the fidelity of color processing are disclosed. One set of embodiments provide a test pattern that exhibits a large number of spatial interactions (e.g., edges) between colors corresponding to triples of constant value RGB primaries that incorporate a specific primary. Another set of embodiments provide an animated sequence of test patterns that exhibit temporal interactions between the colors identified above. Yet another set of embodiments provide a test pattern comprising a plurality of zones, where distinct subsets of the zones are configured to exhibit independent visual changes in response to adjustments of specific color processing controls. Using these test patterns, users may more easily test the fidelity of color processing (such as color dematrixing), and may more easily calibrate color processing controls accordingly.

29 Claims, 13 Drawing Sheets
(9 of 13 Drawing Sheet(s) Filed in Color)

US 9,591,371 B1

MOVING COLOR TEST PATTERN

BACKGROUND OF THE INVENTION

Embodiments of the present invention relate to video test patterns. More particularly, embodiments of the present invention relate to video test patterns and associated techniques for testing the fidelity of color processing.

Traditional video systems (e.g., NTSC, ATSC, etc.) transmit and store color information as luminance and chrominance signals in a $YC_bC_r$ (or $Y'C_bC_r$) color space. In contrast, traditional video pickup devices (e.g., video cameras, telecines, etc.), computers, and display devices (e.g., computer monitors, televisions, etc.) capture, generate, and display color information respectively as red, green, and blue primary signals in an RGB (or R'G'B') color space. As a result, a color video signal is converted from RGB to $YC_bC_r$ at the time of capture/generation, and then converted back to RGB from $YC_bC_r$ at the time of display. These first and second conversions are known as "color matrixing" and "dematrixing."

Video output devices that are configured to perform color dematrixing (e.g., displays, computer graphics subsystems, etc.) typically have user controls labeled tint (or hue) and color (or saturation) that regulate the dematrixing process. A goal in adjusting these controls is to ensure that the video output device properly inverts the original matrixing operation, thus generating an RGB signal from a received $YC_bC_r$ signal that is true to the source RGB representation.

One test pattern that has been used to aid in the adjustment of tint and color controls is known as the SMPTE (Society of Motion Picture and Television Engineers) color bars test pattern (referred to herein as "SMPTE color bars"). This pattern (illustrated in FIG. 1) includes a sequence of seven large color bars corresponding to the colors white, yellow, cyan, green, magenta, red, and blue. Directly below the seven large color bars is a sequence of smaller color bars corresponding to the colors blue, cyan, magenta, and white (interspersed with black). As shown, large white color bar 102 is adjacent to smaller blue color bar 110, large cyan color bar 104 is adjacent to smaller magenta color bar 112, large magenta color bar 106 is adjacent to smaller cyan color bar 114, and large blue color bar 108 is adjacent to smaller white color bar 116. When viewed under a condition that filters out all primaries except for blue, each pair of adjacent bars exhibit a uniform brightness, and therefore appear as a single, contiguous bar, if the tint and color controls of the display device are properly set.

While the SMPTE color bars are serviceable for calibrating tint and color controls (and thus, for testing color dematrixing accuracy), they have several shortcomings. For example, the pattern displays a limited number of side-by-side comparisons (e.g., edges) of the relevant colors of white, cyan, magenta, and blue. As shown in FIG. 1, the pattern includes only two unique edges (white/blue or cyan/magenta), and four edges total (white/blue, cyan/magenta, magenta/cyan, and blue white) between these colors. As a result, it may be difficult for users to judge the precise point at which these colors converge to a uniform brightness in the course of adjusting color and tint controls.

Another drawback is that optical blue filters (such as the Wratten 47B filter), which are commonly used in conjunction with the SMPTE color bars to block out red and green primaries, are relatively difficult and costly to manufacture. Additionally, currently available blue filters cannot completely eliminate all visibility of red and green. This reduces the accuracy of tint and color calibrations performed using the pattern.

Further, the effects of adjusting tint and color controls are interrelated, and the SMPTE color bars provide no guidance on how to adjust one control independently of the other. For example, both tint and color must be set correctly for the brightness of bars 102, 104, 106, 108, 110, 112, 114, 116 in FIG. 1 to converge. If tint is set incorrectly, the pattern provides no visual feedback on how to properly adjust color. Conversely, if color is set incorrectly, the pattern provides no visual feedback on how to properly adjust tint. Thus, users must generally resort to trial and error in finding the exact combination of tint and colors settings that result in brightness convergence of the bars.

Accordingly, what is needed are improved techniques for testing the fidelity of color processing (such as color dematrixing).

BRIEF SUMMARY

The present invention relates to video test patterns. More specifically, embodiments of the present invention provide improved test patterns and associated techniques for testing the fidelity of color processing (such as color dematrixing). One set of embodiments provide a test pattern that exhibits a large number of spatial interactions (e.g., edges) between colors corresponding to triples of constant value RGB primaries that incorporate a specific primary. In one embodiment, the test pattern includes at least one edge between each unique pair of colors. In a further embodiment, the specific primary is red. Another set of embodiments provide an animated sequence of test patterns that exhibit temporal interactions between the colors identified above. Yet another set of embodiments provide a test pattern comprising a plurality of zones, where distinct subsets of the zones are configured to exhibit independent visual changes in response to adjustments of specific color processing controls. Using these test patterns, users may more easily test the fidelity of color processing, and may more easily calibrate color processing controls accordingly.

According to one embodiment of the present invention, a method for testing the fidelity of color processing comprises receiving a first test signal representing a first test pattern. The first test signal defines a first plurality of colors that appear in the first test pattern, where the first plurality of colors exhibit a substantially similar brightness when viewed under a test condition in which only a single, predetermined primary is substantially visible, and a first plurality of edges between contiguous regions of colors in the first test pattern, where for each unique pair of colors in the first plurality of colors, there exists at least one edge in the first plurality of edges between contiguous regions of the unique pair of colors. In various embodiments, the method further comprises causing the first test pattern to be outputted, where the outputted first test pattern is generated based on the first test signal, and where the outputted first test pattern exhibits a second plurality of colors distinct from the first plurality of colors. An adjustment of one or more color processing controls is then received in response to viewing the outputted first test pattern, where the adjustment of the one or more color processing controls is intended to level out brightness of the second plurality of colors when the outputted first test pattern is viewed under the test condition.

In a further embodiment, the method comprises receiving a second test signal representing a second test pattern. The second test signal defines third plurality of colors that appear in the second test pattern, where the third plurality of colors exhibit a substantially similar brightness when viewed under the test condition, and a second plurality of edges between contiguous regions of colors in the second test pattern, where for each unique pair of colors in the third plurality of colors, there exists at least one edge in the second plurality of edges between contiguous regions of the unique pair of colors, and where the first test pattern and the second test pattern are visually distinct. In various embodiments, the method further comprises causing the second test pattern to be outputted, where the outputted second test pattern is generated from the second test signal, and where the outputted second test pattern exhibits a fourth plurality of colors distinct from the third plurality of colors. An adjustment of one or more color processing controls is then received in response to viewing the outputted first and second test patterns, where the adjustment of the one or more color processing controls is intended to reduce an appearance of blinking when the outputted first and second test patterns are viewed in succession under the test condition.

In a further embodiment, the first test signal further defines a plurality of zones in the first test pattern, where each zone in the plurality of zones includes a subset of edges in the first plurality of edges, and where for each zone in the plurality of zones, there exists at least one color in the first plurality of colors that does not appear in the zone. The method further comprises causing the first test pattern to be outputted, where the outputted first test pattern is generated from the first test signal, and where the outputted first test pattern exhibits a second plurality of colors distinct from the first plurality of colors. An adjustment of a first color processing control is received in response to viewing the outputted first test pattern, where the adjustment of the first color processing control is intended to level out brightness of a first subset of zones in the plurality of zones when the outputted first test pattern is viewed under the test condition. An adjustment of a second color processing control is then received in response to viewing the outputted first test pattern, where the adjustment of the second color processing control is intended to level out brightness of a second subset of zones in the plurality of zones when the outputted first test pattern is viewed under the test condition.

According to another embodiment of the present invention, a method for testing the fidelity of color processing comprises receiving a first test signal representing a first test pattern, where the first test signal defines a first plurality of colors that appear in the first test pattern, and where the first plurality of colors exhibit a substantially similar brightness when viewed under a test condition in which only a single, predetermined primary is substantially visible; and receiving a second test signal representing a second test pattern, where the second test signal defines a second plurality of colors that appear in the second test pattern, where the second plurality of colors exhibit a substantially similar brightness when viewed under the test condition, and where the first test pattern and the second test pattern are visually distinct. In various embodiments, the method further comprises causing the first test pattern to be outputted, where the outputted first test pattern is generated from the first test signal, and where the outputted first test pattern exhibits a third plurality of colors distinct from the first plurality of colors; and causing the second test pattern to be outputted, where the outputted second test pattern is generated from the second test signal, and where the outputted second test pattern exhibits a fourth plurality of colors distinct from the second plurality of colors. An adjustment of one or more color processing controls is then received in response to viewing the outputted first and second test patterns, where the adjustment of the one or more color processing controls is intended to reduce an appearance of blinking when the outputted first and second test patterns are viewed in succession under the test condition.

According to another embodiment of the present invention, a method for testing the fidelity of color processing comprises receiving a first test signal representing a first test pattern, where the first test signal defines a first plurality of colors that appear in the first test pattern, where the first plurality of colors exhibit a substantially similar brightness when viewed under a test condition in which only a single, predetermined primary is substantially visible; a first plurality of edges between contiguous regions of colors in the first test pattern; and a first plurality of zones in the first test pattern, where each zone in the first plurality of zones includes a subset of edges in the first plurality of edges, and where, for each zone in the first plurality of zones, there exists at least one color in the first plurality of colors that does not appear in the zone. In various embodiments, the method further comprises causing the first test pattern to be outputted, where the outputted first test pattern is generated from the first test signal, and where the outputted first test pattern exhibits a second plurality of colors distinct from the first plurality of colors. An adjustment of a first color processing control is received in response to viewing the outputted test pattern, where the adjustment of the first color processing control is configured to level out brightness of a first subset of zones in the first plurality of zones when the outputted first test pattern is viewed under the test condition. An adjustment of a second color processing control is then received in response to viewing the outputted test pattern, where the adjustment of the second color processing control is intended to level out brightness of a second subset of zones in the first plurality of zones when the outputted first test pattern is viewed under the test condition.

According to another embodiment of the present invention, an apparatus for testing the fidelity of color processing is disclosed. The apparatus comprises a processing component configured to generate a test signal representing a test pattern, the test signal defining a plurality of colors that appear in the test pattern, where the plurality of colors exhibit a substantially similar brightness when viewed under a test condition in which only a single, predetermined primary is substantially visible; and a plurality of edges between contiguous regions of colors in the test pattern, where for each unique pair of colors in the first plurality of colors, there exists at least one edge in the plurality of edges between contiguous regions of the unique pair of colors.

According to another embodiment of the present invention, a machine-readable medium is disclosed, where the machine-readable medium has stored thereon a representation of a test pattern. In various embodiments, the representation of the test pattern defines a plurality of colors that appear in the test pattern, where the plurality of colors exhibit a substantially similar brightness when viewed under a test condition in which only a single, predetermined primary is substantially visible; and a plurality of edges between contiguous regions of colors in the test pattern, where for each unique pair of colors in the first plurality of colors, there exists at least one edge in the plurality of edges between contiguous regions of the unique pair of colors.

In further embodiments, the representation of the test pattern includes a plurality of instructions which, when executed by a processing component, cause the processing component to generate the test pattern.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order to more fully understand the present invention, reference is made to the accompanying drawings. Understanding that these drawings are not to be considered limitations on the scope of the invention, the presently described embodiments and the presently understood best mode of the invention are described with additional detail through use of the accompanying drawings.

DETAILED DESCRIPTION OF EXEMPLARY EMBODIMENTS

In the following description, for the purposes of explanation, numerous specific details are set forth in order to provide an understanding of the present invention. It will be apparent, however, to one skilled in the art that the present invention may be practiced without some of these specific details. In other instances, well-known structures and devices are shown in block diagram form.

Figure 1:
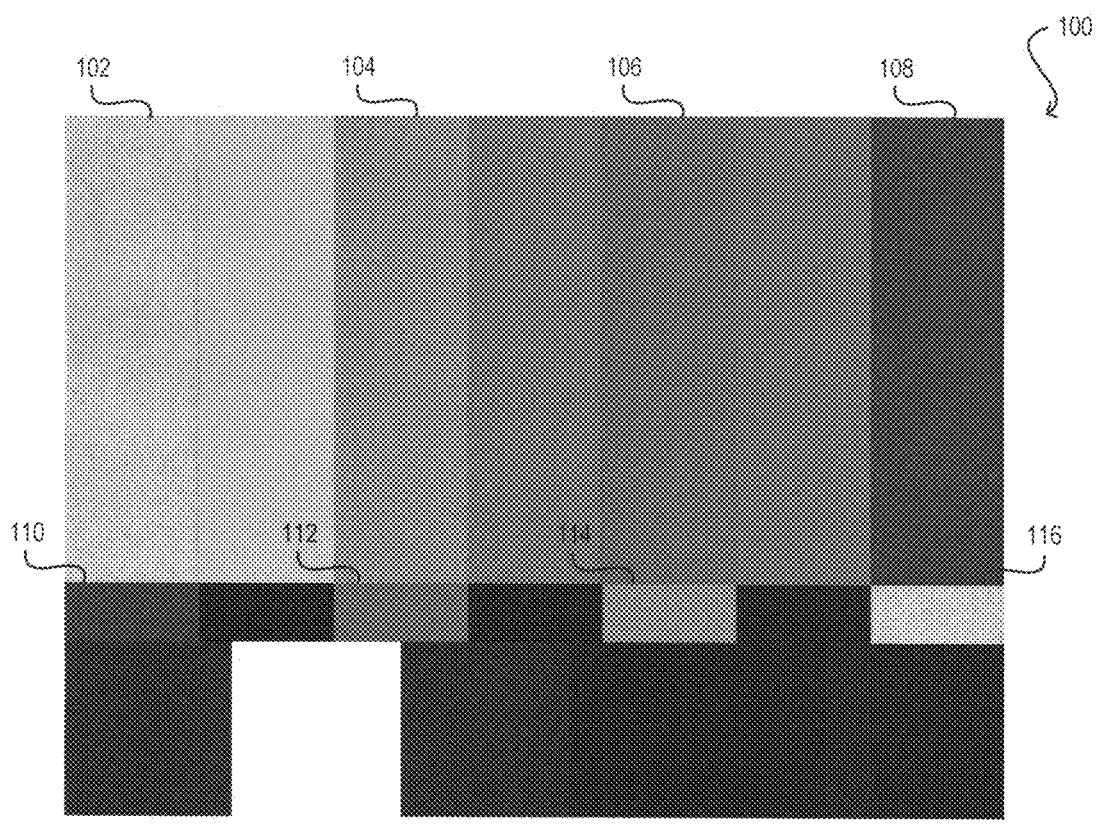
FIG. 1 illustrates the SMPTE color bars test pattern.
Figure 2:
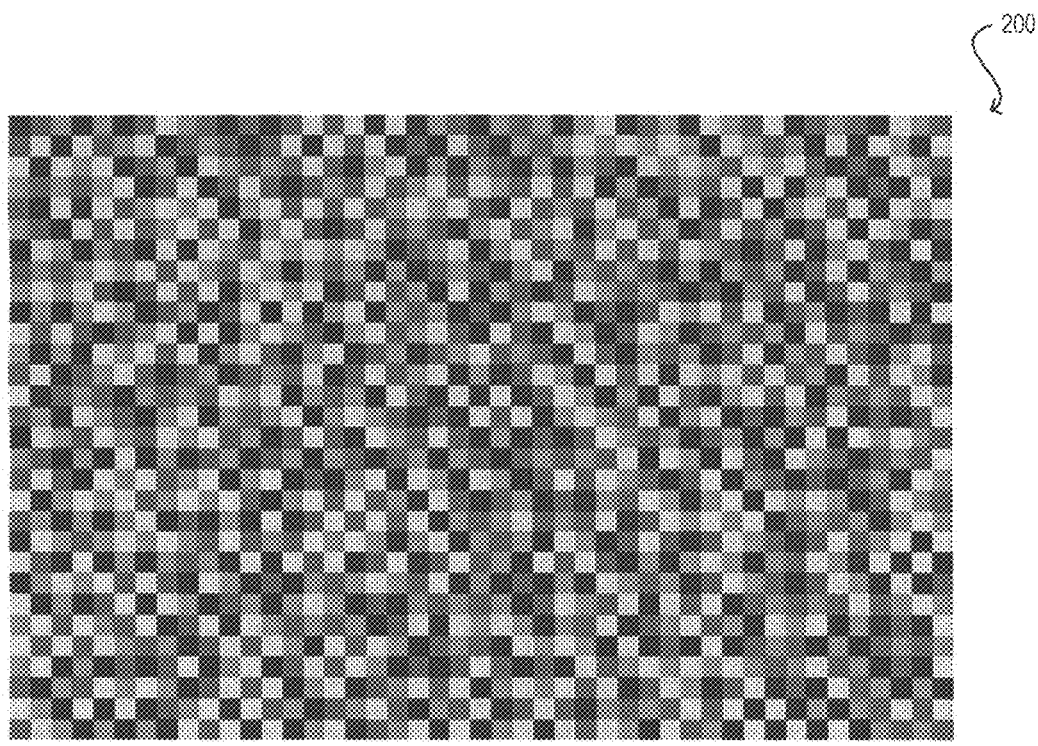
FIG. 2 illustrates a first test pattern in accordance with an embodiment of the present invention.

FIG. 2 illustrates a first test pattern 200 in accordance with an embodiment of the present invention. In one set of embodiments, test pattern 200 (or an encoded version thereof) may be stored on a machine-readable medium including but not limited to RAM, ROM, EEPROM, flash memory, CD-ROM, DVD-ROM, Blu-Ray Disc, HD-DVD or other optical storage, magnetic cassettes, magnetic tape, and magnetic disk storage or other magnetic storage. In other embodiments, test pattern 200 may be generated in real-time by a signal-generating device such as a dedicated test signal generator, DVD player, Blue-Ray Disc player, HD-DVD player, digital video recorder. cable decoder box, video game console, personal computer, or the like. One of ordinary skill in the art would recognize many variations, modifications, and alternatives.

In various embodiments, test pattern 200 is encoded to include a plurality of colors, wherein the plurality of colors represent all possible triples of constant value RGB primaries that incorporate a specific, predetermined primary. These colors exhibit a similar brightness when viewed under a test condition in which only the single, predetermined primary is substantially visible. The particular embodiment depicted in FIG. 2 includes four colors: white (W), cyan (C), magenta (M), and blue (B). These colors represent all possible triples of constant value RGB primaries that incorporate the primary blue. However, it should be appreciated that test pattern 200 is not restricted to using these specific colors. For example, in an alternative embodiment, test pattern 200 may be encoded to include colors corresponding to triples of constant value RGB primaries that incorporate the primary red. In this embodiment, the pattern would include the colors white, yellow, magenta, and red. One of ordinary skill in the art would recognize many variations, modifications, and alternatives.

In one set of embodiments, the colors of test pattern 200 are encoded as full intensity. Accordingly, assuming an intensity range from zero to unity, white will correspond to the RGB triple [1, 1, 1], cyan will correspond to [0, 1, 1], magenta will correspond to [1, 0, 1], and blue will correspond to [0, 0, 1]. In other embodiments, the colors are encoded as less than full intensity. Thus, white will correspond to the RGB triple [N, N, N], cyan will correspond to [0, N, N], magenta will correspond to [N, 0, N], and blue will correspond to [0, 0, N], where N is a constant value greater than zero and less than unity.

As discussed with respect to the SMPTE color bars, test patterns that incorporate colors such as WCMB may be used to adjust the tint and colors controls of a video display device. For example, if the tint and color controls are set incorrectly (indicating incorrect color dematixing), the colors outputted by the device will not be identical to their original RGB representations. Additionally, the outputted colors will appear to have non-uniform brightness when viewed under a test condition in which only a single primary is visible. Conversely, if the tint and color controls are set correctly (indicating correct color dematrixing), the outputted colors will appear to have a uniform brightness when viewed under the test condition.

The inventors of the present invention have determined that it can be difficult for users of test patterns such as the SMPTE color bars to perceive the relative brightness of colors when there are relatively few interactions (e.g., edges) between them. In FIG. 2, test pattern 200 advantageously includes a large number of edges between colors (e.g., triples of constant value RGB primaries). Although a specific number of edges are illustrated, one of ordinary skill in the art will appreciate that this specific number is not required. Rather, embodiments of the present invention encompasses any relatively large number of edges that makes the uniformity or non-uniformity of adjacent colors easy to perceive.

In one embodiment, test pattern 200 includes greater than four total edges between colors. In another embodiment, test pattern 200 includes at least one edge between each unique pair of colors that appear in the pattern. For example, test pattern 200 includes at least one edge between the unique pairs of colors WC, WM, WB, CM, CB, and MB. This configuration allows each unique pair of colors to be easily compared. Of course, each edge between unique pairs of colors may be repeated multiple times throughout the pattern. One of ordinary skill in the art would recognize many variations, modifications, and alternatives.

As shown in FIG. 2, the plurality of edges between colors in test pattern 200 define a plurality of contiguous regions of colors. In the illustrated embodiment, these regions correspond to blocks, or squares. However, it should be appreciated that any other type of regular or irregular region (including, but not limited to, triangles, rectangles, pentagons, hexagons, circles, etc.) may be employed. Additionally, each region may be sized a variable size. For example, some regions may be sized smaller, and some regions may be sized larger. In one embodiment, each region corresponds to the size of a pixel to maximize the number of edges in the pattern. One of ordinary skill in the art would recognize many variations, modifications, and alternatives.

In one set of embodiments, the regions of colors are spatially arranged according to one or more constraints. For example, the regions may be arranged according to a map coloring algorithm, such that no region is adjacent to another region of the same color. Other arrangements are also contemplated and within the scope of the present invention. For example, the regions of colors may be arranged in a completely random fashion. In other embodiments, the regions may be arranged in a specific, predetermined fashion. One of ordinary skill in the art would recognize many variations, modifications, and alternatives.

In certain situations, test pattern 200 may be compressed for storage on a medium (e.g., DVD, Blu-Ray Disc, HD-DVD, etc.) or for transmission over a bandwidth limited channel (e.g., modem, DSL, or cable Internet connection). In some cases, the regions of colors in test pattern 200 may be sized and spatially arranged to align with compression blocks or compression macroblocks. For example, the MPEG-2 format, which is used for DVD-ROMs, stores a single chrominance value for each 16×16 macroblock of source pixels. As a result, regions of color that span across the boundaries of 16×16 macroblocks will exhibit color artifacts after decompression. These color artifacts can make it difficult to distinguish between color errors resulting from compression and color errors resulting from incorrect color dematrixing. By aligning the regions of test pattern 200 with compression blocks/macroblocks, these compression artifacts may be avoided. Various other types of compression formats, such as AVC, VC-1, and the like may employ different sized compression blocks or macroblocks. Thus, if test pattern 200 is compressed using these other formats, the size and arrangement of the color regions may be modified accordingly.

Figure 3:
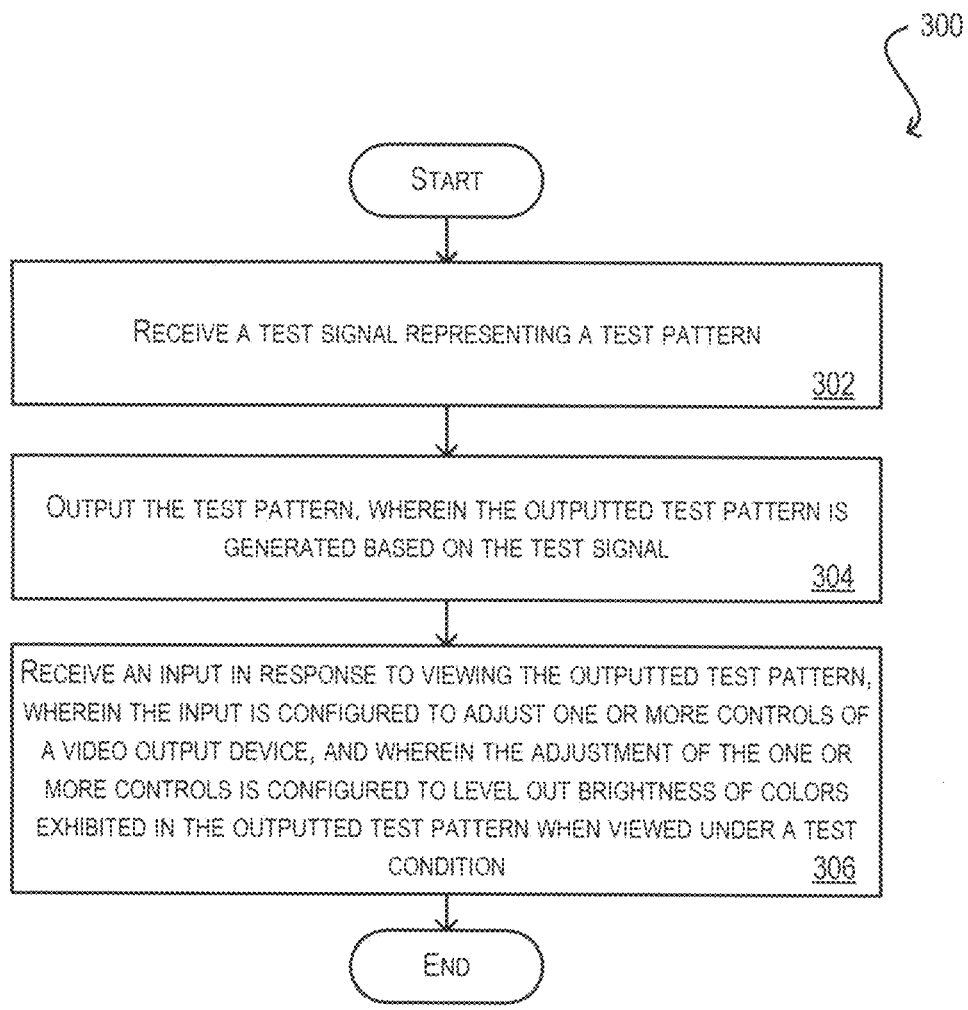
FIG. 3 is a flowchart of the steps performed in using the first test pattern to adjust controls of a video output device in accordance with an embodiment of the present invention.

FIG. 3 is a flowchart 300 of the steps performed in using a test pattern such as pattern 200 to adjust controls of a video output device in accordance with an embodiment of the present invention. In one set of embodiments, the video output device referred to in flowchart 300 may be a display device such as a computer monitor, television, video projector, or the like. In alternative embodiments, the video output device may be a display driver device, such as a DVD player, Blu-Ray Disc player, HD-DVD player, computer, or the like. Further, the processing of flowchart 300 may be implemented in software modules executed by a processor, hardware modules, or combinations thereof. The software modules may be stored on a machine-readable medium. One of ordinary skill in the art would recognize many variations, modifications, and alternatives.

At step 302, a test signal representing a test pattern (such as test pattern 200) is received at a video output device. The test pattern is then outputted, wherein the outputted test pattern is generated based on the test signal (step 304). Typically, the test signal will encode the colors of test pattern 200 in $YC_bC_r$ format. Thus, the video output device will have to dematrix the $YC_bC_r$ color signals to RGB format prior to output. In one set of embodiments, the video output device that receives the test signal at step 302 is also the output device that outputs the test pattern at step 304. For example, a television typically receives a $YC_bC_r$ color signal, dematrixes the $YC_bC_r$ signal to generate an RGB signal, and then uses the RGB signal to drive its display. In other embodiments, the video output device that receives the test signal at step 302 may be different from the output device that outputs the test pattern at 304. For example, the test signal may be received by a computer (the video output device) that dematrixes the signal from $YC_bC_r$ into RGB. The computer may then be configured to transmit the dematrixed RGB signal to a computer monitor (the output device), which uses the RGB signal to drive its display. One of ordinary skill in the art would recognize many variations, modifications, and alternatives.

Assuming that the test signal has not been dematrixed correctly, an input is received by the video output device in response to a viewing of the outputted test pattern (step 306). The input is configured to adjust one or more controls of the video output device (e.g., tint or color), and the adjustment is configured to level out brightness of the colors exhibited in the outputted test pattern when viewed under a test condition in which only a single, appropriate primary is visible. In various embodiments, the test condition may correspond to viewing the outputted pattern through an optical filter such as the Wratten 47B, or may correspond to viewing the outputted pattern on a CRT display that has two of its three electron guns disabled. When the brightness of the colors in the outputted test pattern converge to a single level under the test condition, the color and tint levels of the video output device are set correctly. This also indicates that color dematrixing is being performed correctly. Step 306 may be repeated multiple times until this result is achieved.

It should be appreciated that the specific steps illustrated in FIG. 3 provide a particular method for using a test pattern to adjust controls of a video output device according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
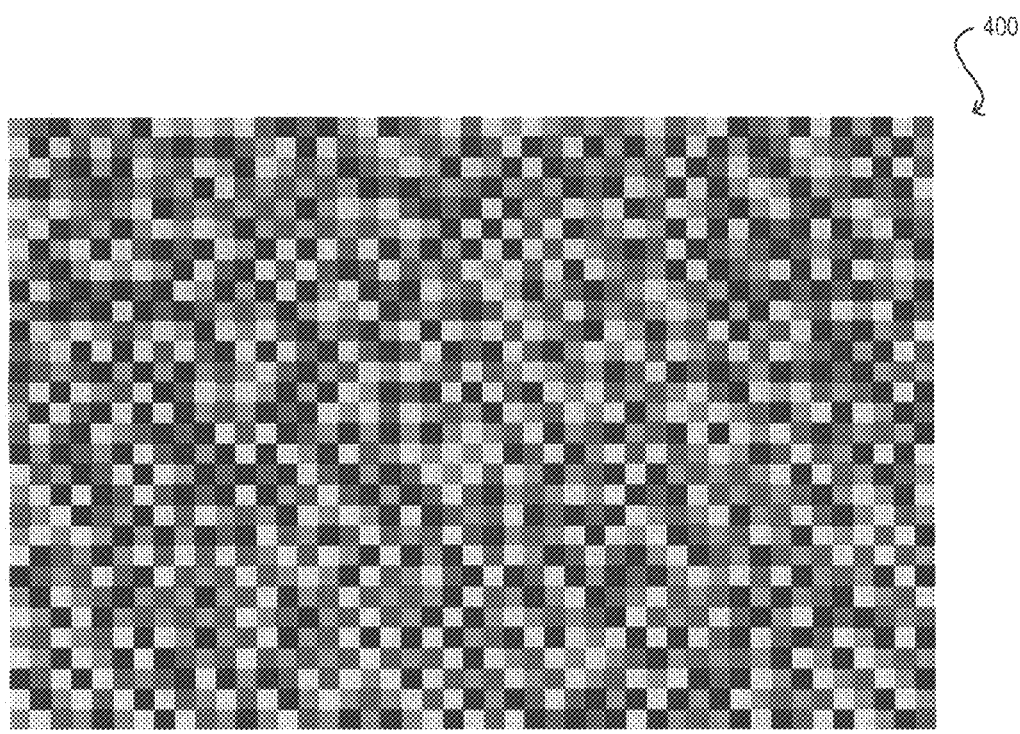
FIG. 4 illustrates a second test pattern in accordance with an embodiment of the present invention.

FIG. 4 illustrates a second test pattern 400 in accordance with an embodiment of the present invention. In various embodiments, test pattern 400 may be combined with test pattern 200 of FIG. 2 to provide an animated sequence of test patterns for testing the accuracy of color dematrixing in a video output device. The inventors of the present invention have recognized that by providing an animated, rather than static, test pattern, users may more easily discern relative brightness between regions of colors.

In one set of embodiments, an animated sequence of test patterns comprises a first test pattern having a first plurality of characteristics as described with respect to test pattern 200 of FIG. 2. For example, the first test pattern includes a first plurality of colors, wherein the first plurality of colors correspond to triples of constant value RGB primaries that incorporate a specific primary. Stated another way, the first plurality of colors exhibit a similar brightness when viewed under a test condition in which only the specific primary is substantially visible. The animated sequence further comprises one or more additional test patterns, wherein the one or more additional test patterns include a second plurality of colors that match the first plurality of colors of the first test pattern. For example, test pattern 400 of FIG. 4 represents a second test pattern that includes the same colors (WCMB) as test pattern 200.

In various embodiments, the one or more additional test patterns display a spatial arrangement of the colors that may be visually distinct from the first test pattern (and each other). In one set of embodiments, the one or more additional test patterns may display the same visual structure as the first test pattern, but display a different configuration of colors in said structure. For example, test pattern 400 displays a grid of blocks that is structurally identical to test pattern 200 of FIG. 2. However, the color of each block in test pattern 400 has been changed to a different color within the set of (WCMB). In these embodiments, the alternative color configurations of the one or more additional test patterns may be selected randomly or according to some predetermined pattern.

In alternative embodiments, the one or more additional test patterns may display a structure that is completely different from the first test pattern (and each other). For example, the one or more additional test patterns may display an arrangement of circles, and arrangement of hexagons, etc. One of ordinary skill in the art would recognize many variations, modifications, and alternatives.

A purpose in configuring the test patterns in this manner is to generate temporal interactions between the colors in the patterns. In practice, the temporal interactions create a blinking effect when the colors display varying levels of brightness under the aforementioned test condition. Thus, this blinking can serve as an indicator that the tint and color controls of a video output device are incorrectly set (and that color dematrixing is being performed incorrectly). Similarly, a reduction or disappearance of the blinking effect can serve as an indicator that the tint and color controls are correctly set (and that color dematrixing is being performed correctly).

Figure 5:
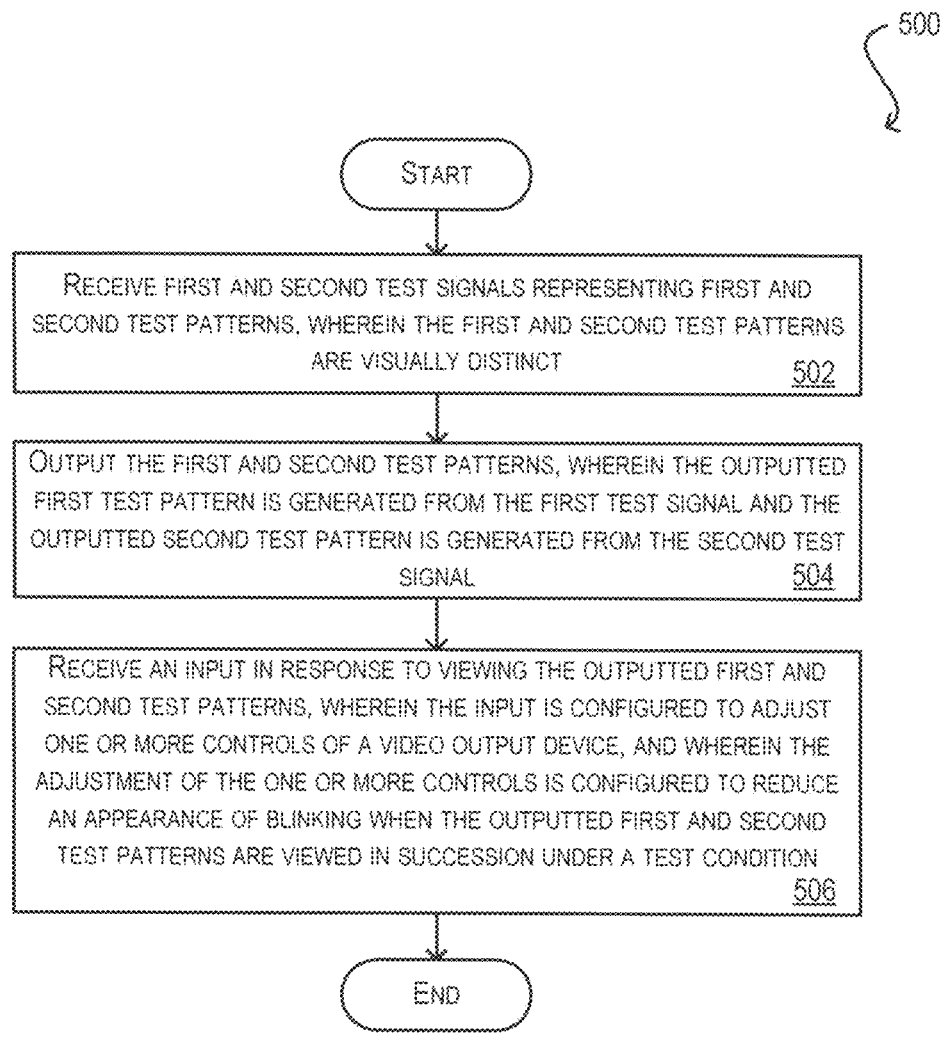
FIG. 5 is a flowchart of the steps performed in using the first and second test patterns to adjust controls of a video output device in accordance with an embodiment of the present invention.

FIG. 5 is a flowchart 500 of the steps performed in using an animated sequence of test patterns, such a sequence of pattern 200 and pattern 400, to adjust controls of a video output device in accordance with an embodiment of the present invention. In one set of embodiments, the video output device referred to in flowchart 500 may be a display device such as a computer monitor, television, video projector, or the like. In alternative embodiments, the video output device may be a display driver device, such as a DVD player, Blu-Ray Disc player, HD-DVD player, computer, or the like. Further, the processing of flowchart 500 may be implemented in software modules executed by a processor, hardware modules, or combinations thereof. The software modules may be stored on a machine-readable medium. One of ordinary skill in the art would recognize many variations, modifications, and alternatives.

At step 502, first and second test signals representing first and second test patterns are received. The first and second test patterns are then outputted in succession, wherein the outputted first test pattern is generated from the first test signal and the outputted second test pattern is generated from the second test signal (step 504). The interval of time between outputting the first and second test patterns may vary. In various embodiments, the interval of time may be long enough to prevent the patterns from visually fusing into a single image, and yet short enough generate temporal interactions between the patterns in the processing center of the viewer (e.g., the human brain).

Assuming that the first and second test signals have not been dematrixed correctly, an input is received in response to a viewing of the outputted first and second test patterns (step 506). The input is configured to adjust one or more controls of a video output device (e.g., tint or color), and the adjustment is configured to reduce an appearance of blinking when the outputted first and second patterns are viewed in succession under a test condition in which only a single, appropriate primary is visible. When the blinking effect substantially reduces or disappears under the test condition, the color and tint levels of the video output device are set correctly. This also indicates that color dematrixing is being performed correctly. Step 506 may be repeated multiple times until this result is achieved.

It should be appreciated that the specific steps illustrated in FIG. 5 provide a particular method for using an animated sequence of test patterns to adjust controls of a video output device according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
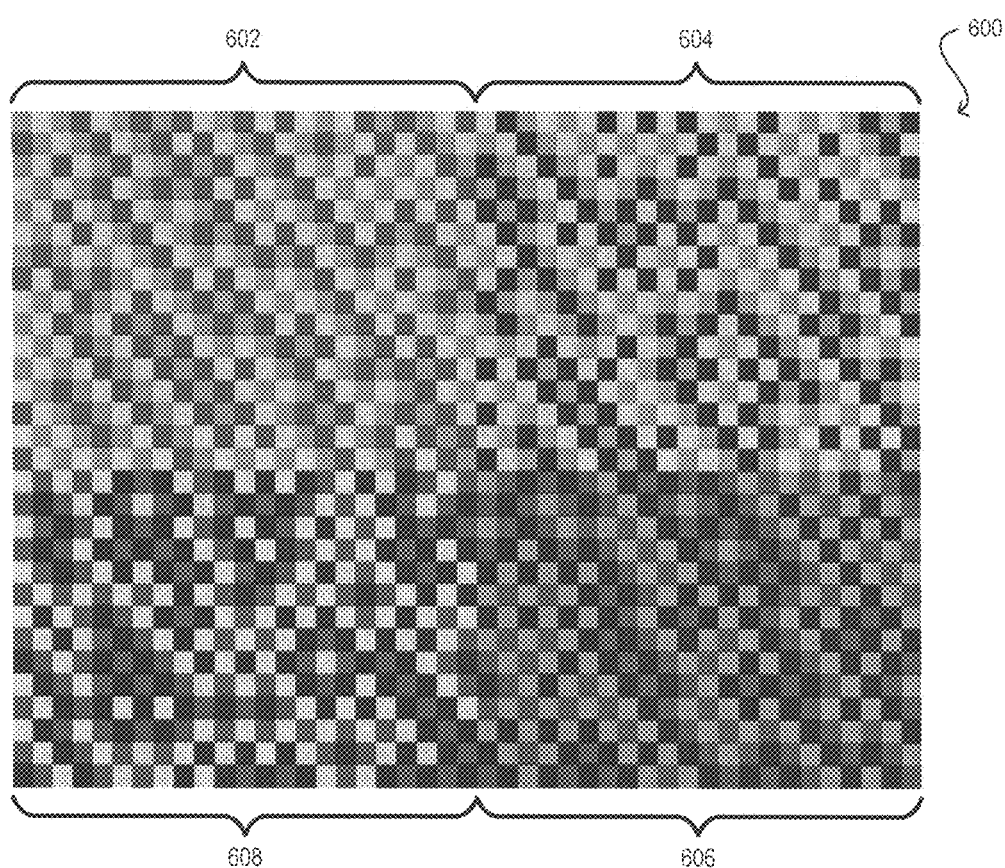
FIG. 6 illustrates a third test pattern in accordance with an embodiment of the present invention.

FIG. 6 illustrates a third test pattern 600 in accordance with an embodiment of the present invention. In one set of embodiments, test pattern 600 (or an encoded version thereof) may be stored on a machine-readable medium including but not limited to RAM, ROM, EEPROM, flash memory, CD-ROM, DVD-ROM, Blu-Ray Disc, HD-DVD or other optical storage, magnetic cassettes, magnetic tape, and magnetic disk storage or other magnetic storage. In other embodiments, test pattern 600 may be generated in real-time by a signal-generating device such as a dedicated test signal generator, DVD player, Blue-Ray Disc player, HD-DVD player, digital video recorder. cable decoder box, video game console, personal computer, or the like. One of ordinary skill in the art would recognize many variations, modifications, and alternatives.

As shown, test pattern 600 includes a plurality of zones 602, 604, 606, 608, wherein each zone includes a subset of edges/regions defined in the pattern. In various embodiments, distinct subsets of zones in the plurality of zones are configured to exhibit independent, coherent visual changes when a specific control of a video output device is adjusted. This enables independent adjustment/correction of the specific control. By way of example, consider the tint and color controls of a video output device. There are four possible ways in which these two controls may be incorrectly set (too much tint/too much color, too much tint/too little color, too little tint/too much color, too little tint, too little color). Accordingly, test pattern 600 may be divided into quadrants that reflect these combinations of errors. In various embodiments, two of the quadrants are configured to exhibit a coherent visual change when tint is adjusted, and the two other quadrants are configured to exhibit a coherent visual change when color is adjusted. In this manner, the adjustment of these two otherwise interrelated controls may be decoupled.

In one set of embodiments, the above effect is achieved by using a subset of colors selected from a plurality of colors (corresponding to constant value RGB primaries that incorporate a specific primary) in each zone. In one embodiment, each zone excludes at least one color from the plurality of colors, and the at least one color is different for each zone. For example, test pattern 600 is encoded with the colors WCMB. Accordingly, zone 602 uses the colors CMW, zone 604 uses WCB, zone 606 uses CMB, and zone 608 uses WMB. In practice, this configuration causes a coherent brightening of zone 602 and darkening of zone 606 when tint is adjusted (and when viewed in the absence of red and green), with little, if any, coherent visual change in zones 604 or 608. Further, this configuration causes a coherent brightening of zone 604 and darkening of zone 608 when color is adjusted (and when viewed in the absence of red and green), with little, if any, coherent visual change in zones 602 or 606.

This embodiment serves as a clear visual guide to independently adjusting these controls. Specifically, tint may be adjusted until the brightness of zones 602 and 604 match, and color may be adjusted until the brightness of zones 604 and 608 match. The resulting combination of tint and color levels will correspond to correct color dematrixing in the associated video output device.

Although test pattern 600 depicts each zone as a quadrant consuming exactly one fourth of the area of the pattern, it should be appreciated that embodiments of the present invention may include any number of zones, and each zone may take any shape, size or arrangement. Further, multiple instances of each zone are contemplated. Yet further, although the relevant zones for tint (602, 606) and color (604, 608) are shown as nonadjacent, they may also be situated to be adjacent. One of ordinary skill in the art would recognize many variations, modifications, and alternatives.

Figure 7:
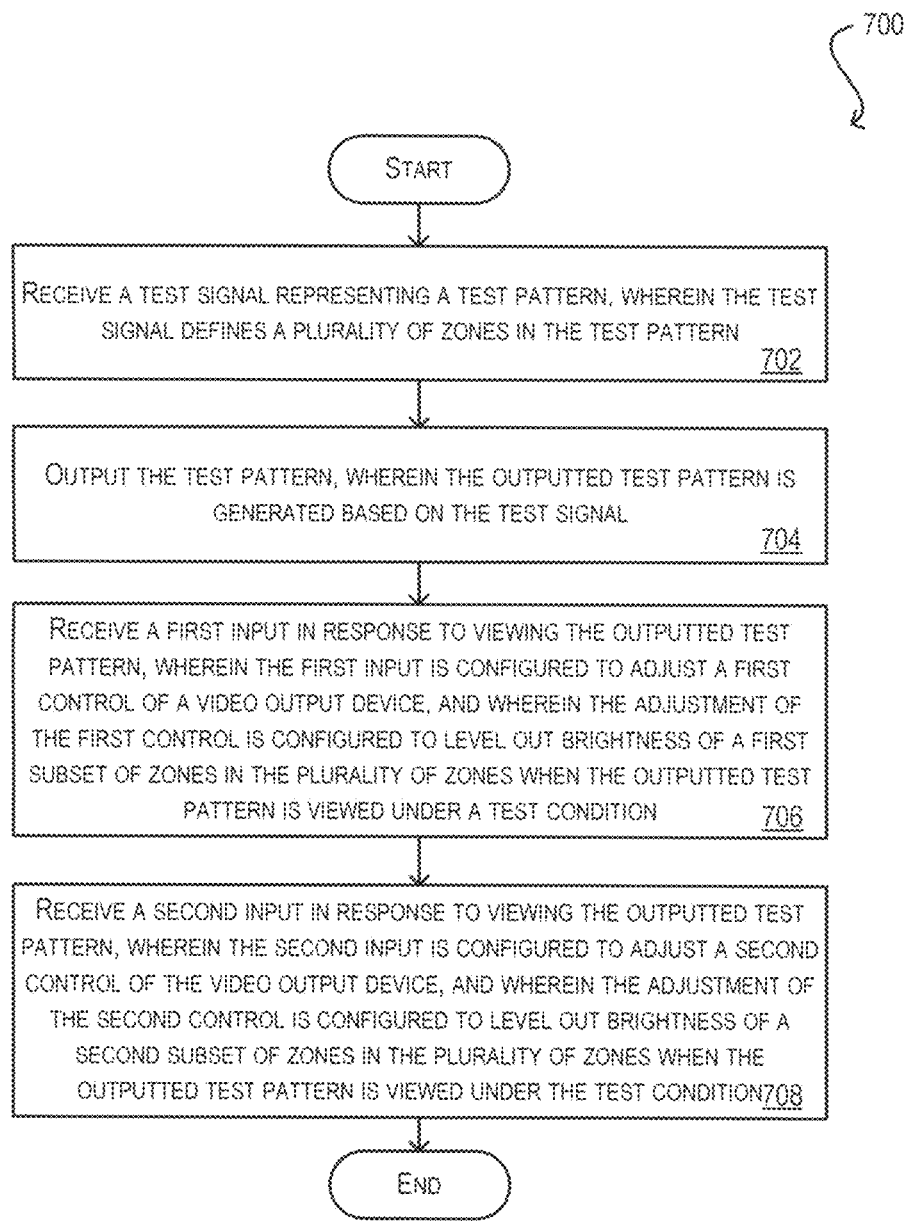
FIG. 7 is a flowchart of the steps performed in using the third test pattern to adjust controls of a video output device in accordance with an embodiment of the present invention.

FIG. 7 is a flowchart 700 of the steps performed in using a test pattern such as pattern 600 to adjust controls of a video output device in accordance with an embodiment of the present invention. In one set of embodiments, the video output device referred to in flowchart 700 may be a display device such as a computer monitor, television, video projector, or the like. In alternative embodiments, the video output device may be a display driver device, such as a DVD player, Blu-Ray Disc player, HD-DVD player, computer, or the like. Further, the processing of flowchart 700 may be implemented in software modules executed by a processor, hardware modules, or combinations thereof. The software modules may be stored on a machine-readable medium. One of ordinary skill in the art would recognize many variations, modifications, and alternatives.

At step 702, a test signal representing a test pattern is received, wherein the test signal defines a plurality of zones in the test pattern. In various embodiments, the plurality of zones reflect the characteristics described with respect to FIG. 6. The test pattern is then outputted, wherein the outputted test pattern is generated from the test signal (step 704).

Assuming that the test signal has not been dematrixed correctly, a first input is received in response to a viewing of the outputted test pattern (step 706). The first input is configured to adjust a first control (e.g., tint) of a video output device, and the adjustment is configured to level out brightness of a first subset of zones in the plurality of zones when the outputted test pattern is viewed under a test condition in which only a single, appropriate primary is visible. In the case of test pattern 600, this corresponds to leveling out the brightness of quadrants 602 and 606. When the brightness of the first subset of zones converge under the test condition, the first control the video output device is set correctly. Step 706 may be repeated multiple times until this result is achieved.

Thereafter, a second input may be received in response to a viewing of the outputted test pattern (step 708). The second input is configured to adjust a second control (e.g., color) of the video output device, and the adjustment is configured to level out brightness of a second subset of zones in the plurality of zones when the outputted test pattern is viewed under the test condition. In the case of test pattern 600, this corresponds to leveling out the brightness of quadrants 604 and 608. When the brightness of the second subset of zones converge under the test condition, the second control the video output device is set correctly. Additionally, since the first control as has already been calibrated, the outputted test pattern should appear as a flat field of brightness, indicating that color dematrixing is being performed correctly. Step 708 may be repeated multiple times until this result is achieved.

It should be appreciated that the specific steps illustrated in FIG. 7 provide a particular method for using a test pattern to adjust controls of a video output device according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
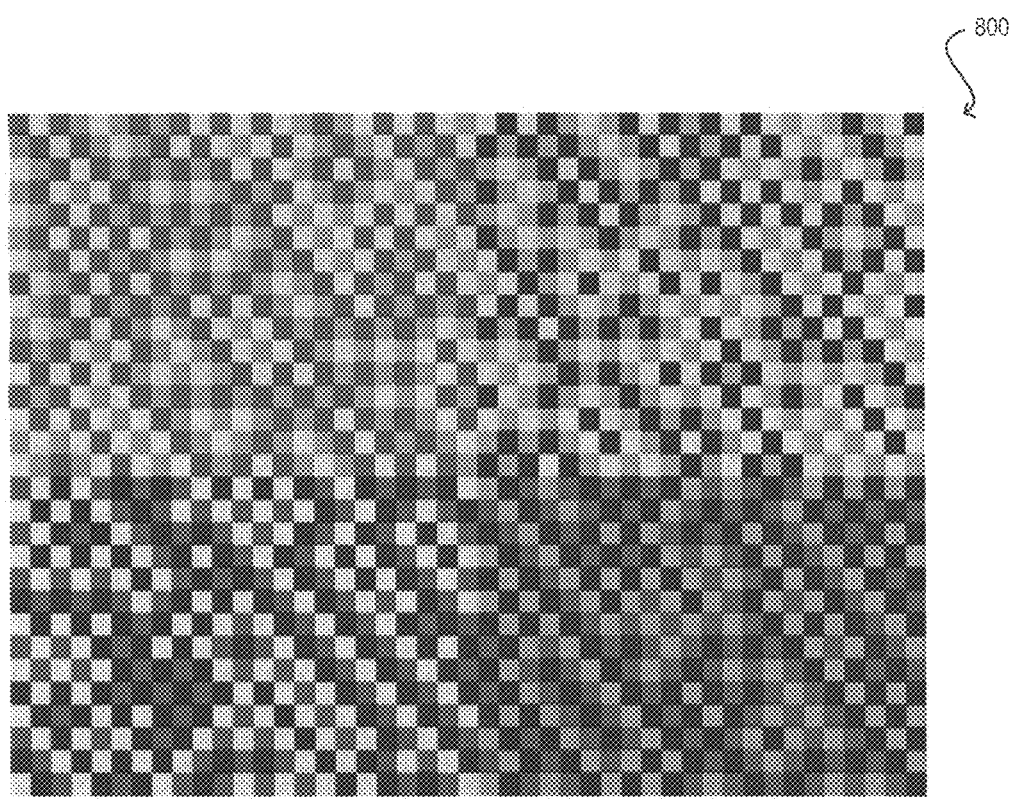
FIG. 8 illustrates a fourth test pattern in accordance with an embodiment of the present invention.

FIG. 8 illustrates a fourth test pattern 800 in accordance with an embodiment of the present invention. Test pattern 800 represents an alternative configuration of test pattern 600 in FIG. 6 that may be used in conjunction with pattern 600 to provide an animated sequence of test patterns. In various embodiments, this animated sequence retains the characteristics described for test pattern 600 (e.g., enablement of independent adjustment of tint and color controls) but also takes advantage of the temporal interactions between colors described with reference to FIG. 4. Accordingly, relative brightness between colors in the patterns may be more easily perceived, and the controls of the video output device (e.g., tint and color) may be more easily and precisely adjusted.

Figure 9A:
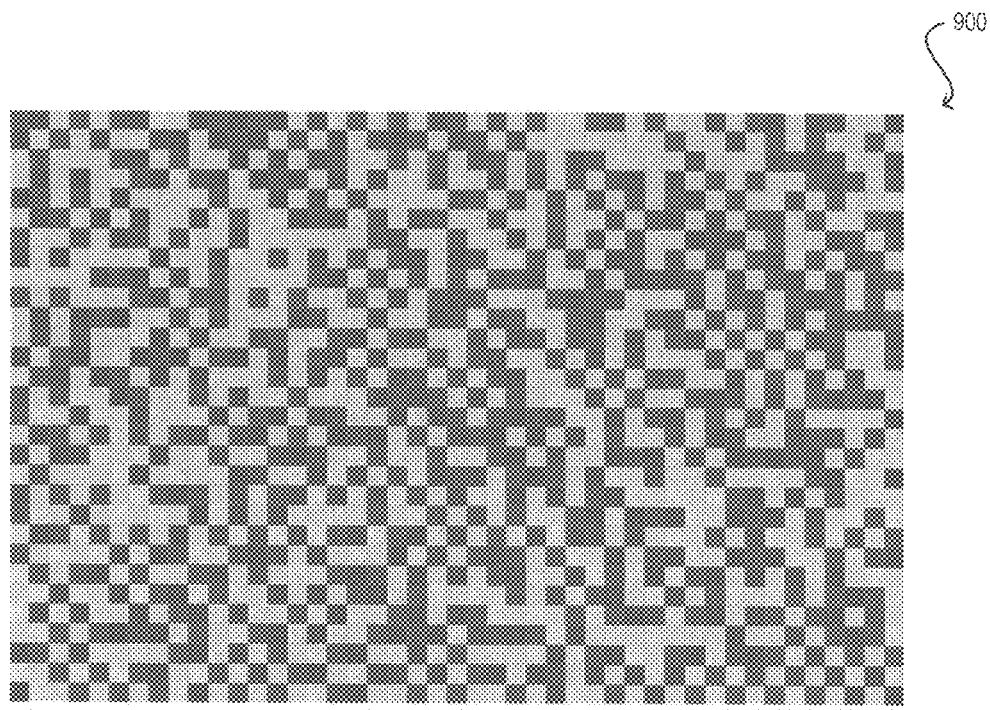
FIGS. 9A and 9B illustrate fifth and sixth test patterns in accordance with an embodiment of the present invention.
Figure 9B:

FIGS. 9A and 9B illustrate fifth and sixth test patterns 900, 950 in accordance with an embodiment of the present invention. Although the preceding embodiments have been illustrated using the colors WCMB, other combinations of colors that correspond to triples of constant value RGB primaries incorporating a specific primary may be used and are within the scope of the present invention. For example, test pattern 900 is similar to test pattern 200 of FIG. 2, but uses the colors white, yellow, magenta, and red (WYMR, which all incorporate red). The inventors of the present invention have recognized that it may be preferable to use WYMR instead of WCMB in certain circumstances because optical red filters are easier and less expensive to produce than optical blue filters. Further, optical red filters are generally more effective than optical blue filters at filtering out unwanted primaries. Test pattern 950 represents an alternative configuration of test pattern 900 that may be used in conjunction with pattern 900 to provide an animated sequence of patterns.

Figure 10A:
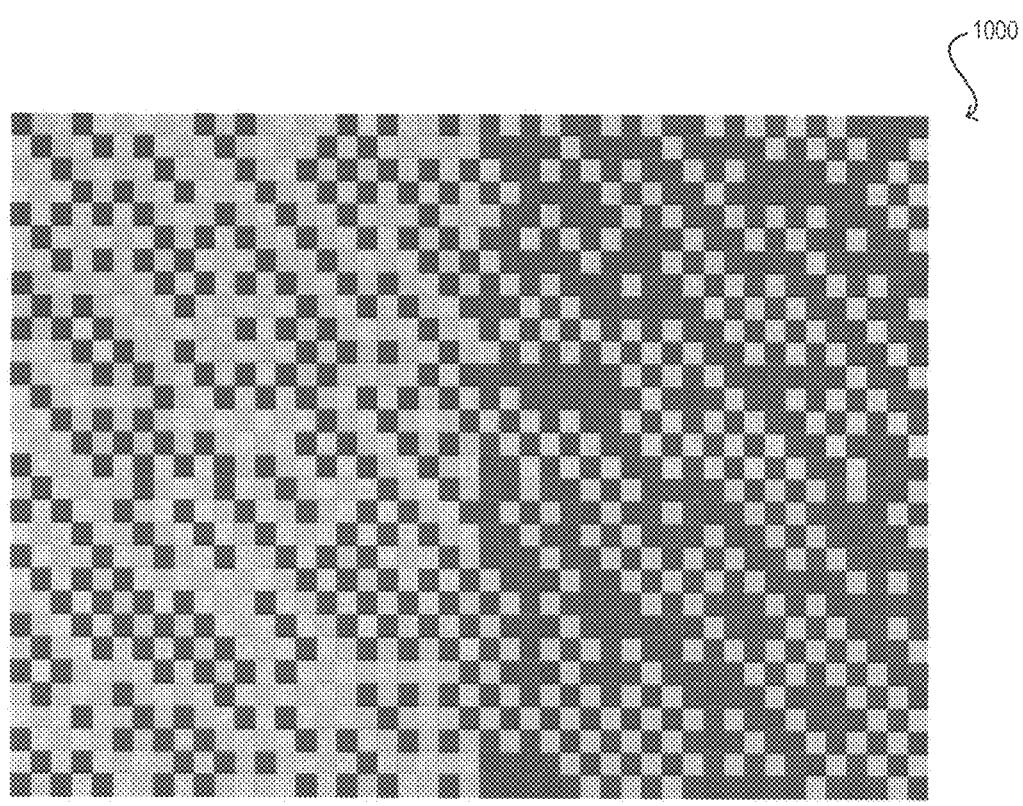
FIGS. 10A and 10B illustrate seventh and eighth test patterns in accordance with an embodiment of the present invention.
Figure 10B:
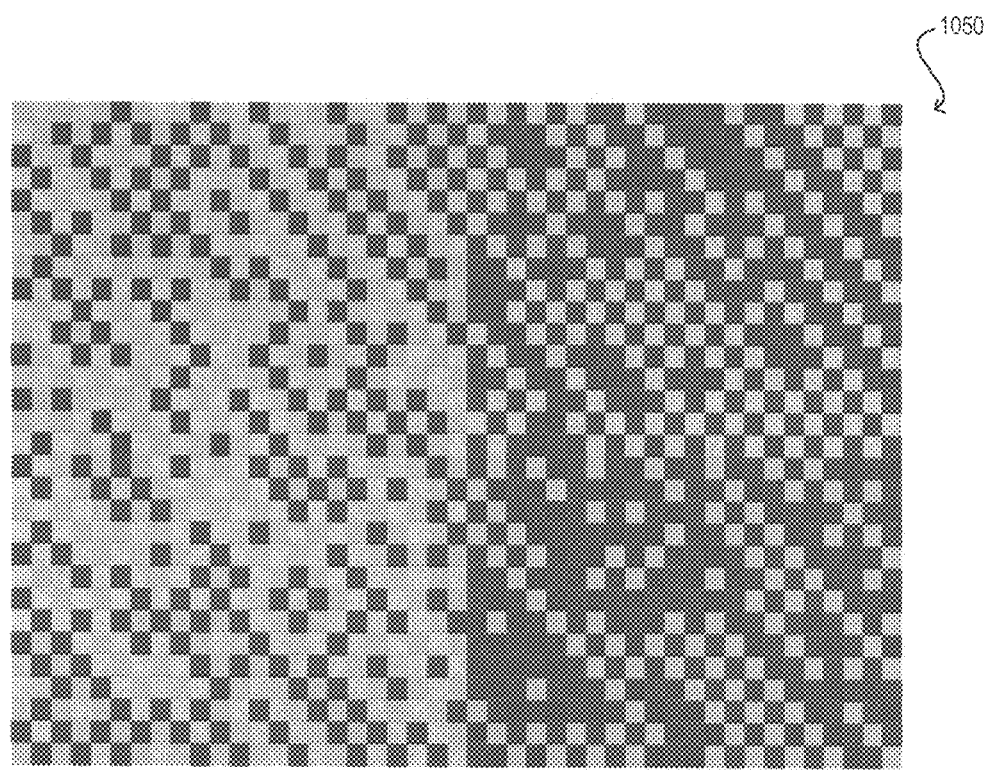

FIGS. 10A and 10B illustrate seventh and eighth test patterns 1000, 1050 in accordance with an embodiment of the present invention. Test patterns 1000 and 1050 represent examples of WYMR versions of test patterns 600 and 800 respectively.

Figure 11:
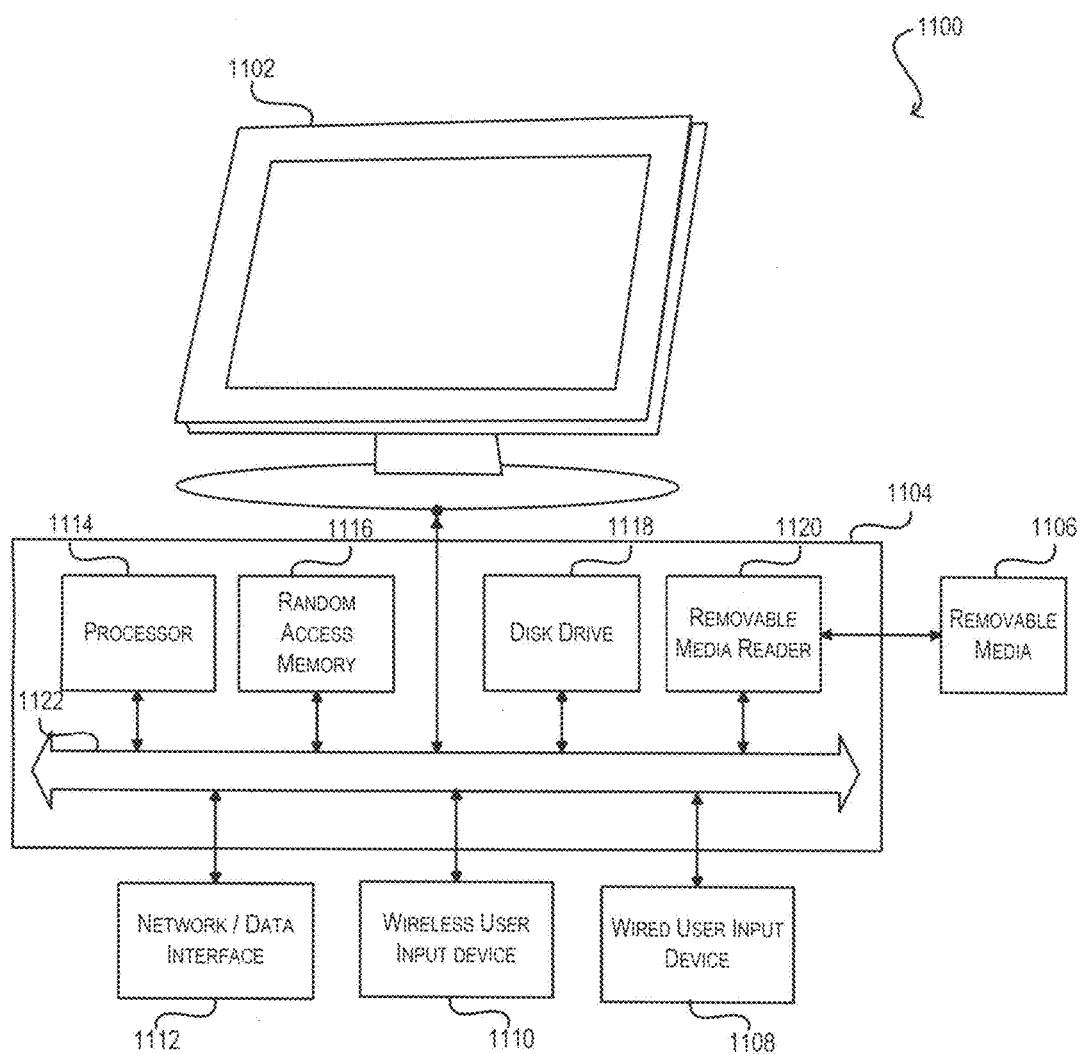
FIG. 11 is a block diagram of a display system that may be used in accordance with an embodiment of the present invention.

FIG. 11 is a block diagram of an exemplary display system 1100 that may be used in accordance with an embodiment of the present invention. As shown, display system 1100 includes a display driver 1104 communicatively coupled with one or more display devices 1102. In various embodiments, display driver 1104 may also be communicatively coupled with a variety of user input devices 1108, 1110, removable media 1106, and one or more other devices via network/data interface 1112.

Display device 1102 is any type of device capable of outputting an image. In one set of embodiments, display device 1102 is a direct-view display such as a CRT display, plasma display, LCD display, OLED display, or the like. Some common embodiments include a home-theater display, a computer display, etc. In other embodiments, display device 1102 is a front-projection display such as a DLP projector, LCD projector, CRT projector, or the like. Such displays typically include a reflective-type screen configured to reflect light back to a viewer. Some common embodiments include a home-theater display, a commercial big-screen theater display, etc. In yet other embodiments, display device 1102 is a rear-projection display such as a DLP rear-projection display, LCD rear-projection display, LCoS rear-projection display, CRT rear-projection display, or the like.

In one set of embodiments, display device 1102 may be configured to receive a test signal corresponding to a test pattern, and output the pattern in accordance with FIGS. 3, 5, and/or 7. In one embodiment, the test signal is received from display driver 1104. Display device 1102 may be further configured to receive one or more inputs for adjusting one or more controls (e.g., tint and color) of the display device, thereby ensuring that the display device accurately dematrixes the received test signal from $YC_bC_r$ color space to RGB color space.

Display driver 1104 is any type of device capable of outputting a signal representative of an image to a display device such as display device 1102. In one embodiment, display driver 1104 may correspond to a standalone device such as an optical disc-based media player (e.g., CD, DVD, Blu-Ray Disc, HD-DVD, etc.), a hard disk-based media player (e.g., digital video recorder, etc.), a cable decoder box, a media center or media extender (e.g., AppleTV, media center PC, etc.), a personal computer, a dedicated test signal generator, a video game console (e.g., Xbox 360, Playstation 3, Wii, etc.), a hand-held device (e.g., PDA, iPod, PSP, Zune, etc.), a video cassette player, or the like. In other embodiments, display driver 1104 may be considered a component within a device, such as a hardware circuit or an auxiliary processing board (e.g., graphics processor unit or video card). In various embodiments, display driver 1104 may be local to, or remote from, display device 1102. For example, display driver 1104 may be a DVD player that is situated next to display device 1102. Alternatively, display driver 1104 may be a test signal generator located in a broadcasting station many miles away from display device 1102.

In one set of embodiments, display driver 1104 may be configured to retrieve or generate a test signal representing a test pattern, and transmit the test signal to display device 1102. Display device may then be configured to dematrix the test signal from $YC_bC_r$ color space to RGB color space. In another set of embodiments, display driver 1104 may be configured receive a test signal, dematrix the signal from $YC_bC_r$ to RGB, and transmit the dematrixed RGB signal to display device 1102. In these embodiments, display driver 1104 would be configured to receive one or more inputs for adjusting one or more controls (e.g., tint and color) of the display driver, thereby ensuring that the display driver accurately dematrixes the test signal.

As shown in FIG. 11, display driver 1104 may include one or more processors 1114 and one or more volatile memory storage areas such as a random access memory (RAM) 1116. Random access memory 1116 may be configured to store one or more computer programs for execution by processor 1114, such as a program configured to generate a test pattern in accordance with embodiments of the present invention. Display driver 1104 may further include one or more non-volatile memory storage areas such as disk drives 1118, a removable media reader 1120 (providing access to removable media 1106), and an electrical bus 1122 interconnecting the above components.

In one set of embodiments, disk drive 1118 and/or removable media 1106 may be configured to store a representation of one or more test patterns in accordance with embodiments of the present invention. Removable media 1106 may correspond to any type of nonvolatile storage media or device, such as optical media (e.g., CD-ROM, DVD-ROM, Blu-Ray Disc, HD-DVD, etc.), nonvolatile flash media (e.g., CompactFlash, SD, MemoryStick. etc.), removable hard disks, or the like.

In various embodiments, display driver 1104 may be communicatively coupled with one or more wired user input devices 1108 and/or one or more wireless user input devices 1110. Wired user input device 1108 may be any type of input device capable of communication via a wired connection/protocol (e.g., USB, Firewire, PS/2. etc.) such as a keyboard, mouse, a trackball, a track pad, a joystick, a game controller, a drawing tablet, microphone, and the like. Wireless user input device 1110 may be any type of input device capable of communication via a wireless connection/protocol (e.g., infrared, radio frequency (RF), Bluetooth, etc.) such as a wireless remote control, a wireless keyboard, wireless mouse, a wireless game controller, and the like. In various embodiments, user input devices 1108, 1110 allow a user to select objects, icons, text and the like that graphically appear on a display via one or more input commands such as a button click or the like. In some embodiments, user input device 1108 may include controls (e.g., buttons, switches, etc.) physically located on display driver 1104.

In further embodiments, one or more network/data interfaces 1112 may be provided for communicatively coupling display driver 1104 with other devices. For example, network/data interface 1112 may couple display driver 1104 with one or more computers on a computer network, a FireWire device, a Satellite cable connection, an optical cable, a wired-cable connection, or the like. Network/data interface 1112 may include an Ethernet-based network adapter, modem (e.g., telephone, satellite, cable, ISDN, etc.), (asynchronous) digital subscriber line (DSL) unit, FireWire interface, USB interface, CableCard™ interface, and the like. Further, network/data interface 1112 may be physically integrated on a motherboard of display driver 1104, or may be a software program such as soft DSL or the like.

In some embodiments, network/data interface 1112 may be configured to receive analog or digital image data to be decoded and output to viewers via display device 1102. In one set of embodiments, network/data interface 1112 may be configured to receive representations of one or more test patterns in accordance with the foregoing disclosure.

Although specific embodiments of the invention have been described, various modifications, alterations, alternative constructions, and equivalents are also encompassed within the scope of the invention. For example, while the present invention has been described with reference to certain test patterns, similar test patterns exhibiting alternative configurations and/or colors are contemplated. Accordingly, the scope of the present invention should not be limited to the test patterns illustrated herein. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for testing the fidelity of color processing, the method comprising:
   receiving a first test signal representing a first test pattern comprising colors, wherein the first test signal defines:
   (a) a first plurality of colors that appear in the first test pattern, the first plurality of colors including at least three colors, each of the first plurality of colors including a predetermined primary and filling contiguous regions in the first test pattern, wherein each of the first plurality of colors is a different combination of intensities of primaries that include the predetermined primary; and
   (b) a first plurality of edges between the contiguous regions of the first plurality of colors in the first test pattern, wherein, for each unique pair of colors in the first plurality of colors, there exists, in the first plurality of edges, at least one edge between contiguous regions of the unique pair of colors; and
   causing the first test pattern to be outputted, wherein the outputted first test pattern is generated based on the first test signal, and wherein the outputted first test pattern exhibits a second plurality of colors distinct from the first plurality of colors.

2. The method of claim 1 further comprising:
   receiving, in response to viewing the outputted first test pattern, an adjustment of one or more color processing controls, wherein the adjustment of the one or more color processing controls is intended to level out brightness of the second plurality of colors when the outputted first test pattern is viewed under the test condition.

3. The method of claim 1 wherein the first plurality of colors include white, magenta, cyan, and blue, and wherein the predetermined primary is blue.

4. The method of claim 1 wherein the first plurality of colors include white, yellow, magenta, and red, and wherein the predetermined primary is red.

5. The method of claim 1 wherein no contiguous region of color in the first test pattern is adjacent to another contiguous region of the same color.

6. The method of claim 1 wherein the first plurality of edges are spatially arranged in the first test pattern such that they align with edges of compression macroblocks.

7. The method of claim 1 wherein the first plurality of colors are represented in the test signal by a first plurality of color signals encoded in a YCbCr color space, wherein the first plurality of colors signals are derived from a second plurality of color signals encoded in an RGB color space, and wherein each color signal in the second plurality of color signals corresponds to an RGB triple, a value of each component in the RGB triple being either a constant, non-zero value or zero.

8. The method of claim 1 further comprising:
   receiving a second test signal representing a second test pattern, wherein the second test signal defines:
   (a) a third plurality of colors that appear in the second test pattern filling contiguous regions in the second test pattern, wherein each of the second plurality of colors is a different combination of intensities of primaries; and
   (b) a second plurality of edges between the contiguous regions of the second plurality of colors in the second test pattern, wherein, for each unique pair of colors in the third plurality of colors, there exists, in the second plurality of edges, at least one edge between contiguous regions of the unique pair of colors, and
   causing the second test pattern to be outputted, wherein the outputted second test pattern is generated from the second test signal, and wherein the outputted second test pattern exhibits a fourth plurality of colors distinct from the third plurality of colors,
   wherein the first test pattern and the second test pattern are visually distinct.

9. The method of claim 1 wherein the first test signal further defines a plurality of zones in the first test pattern, wherein each zone in the plurality of zones includes a subset of edges in the first plurality of edges, and wherein, for each zone in the plurality of zones, there exists at least one color in the first plurality of colors that does not appear in the zone.

10. The method of claim 1, wherein each color of the first plurality of colors has a same intensity for each of the primaries of the color.

11. The method of claim 1, wherein each of the first plurality of colors exhibits a uniform brightness when viewed under a test condition in which only the first primary is visible.

12. The method of claim 2 wherein the one or more color processing controls include a tint control and a color control.

13. The method of claim 7 wherein the constant, non-zero value is less than unity.

14. The method of claim 8 further comprising:
   receiving, in response to viewing the outputted first and second test patterns, an adjustment of one or more color processing controls, wherein the adjustment of the one or more color processing controls is intended to reduce an appearance of blinking when the outputted first and second test patterns are viewed in succession under the test condition.

15. The method of claim 9 wherein the at least one color is different for each zone in the plurality of zones.

16. The method of claim 9 further comprising:
receiving, in response to viewing the outputted first test pattern, an adjustment of a first color processing control, wherein the adjustment of the first color processing control is intended to level out brightness of a first subset of zones in the plurality of zones when the outputted first test pattern is viewed under the test condition; and
receiving, in response to viewing the outputted first test pattern, an adjustment of a second color processing control, wherein the adjustment of the second color processing control is intended to level out brightness of a second subset of zones in the plurality of zones when the outputted first test pattern is viewed under the test condition.

17. A method for testing the fidelity of color processing, the method comprising:
receiving a first test signal representing a first test pattern, wherein the first test signal defines a first plurality of colors that appear in the first test pattern, the first plurality of colors including at least three colors, each of the first plurality of colors including a first primary as a predetermined primary, wherein each of the first plurality of colors is a different combination of intensities of primaries, and wherein for each unique pair of colors in the first plurality of colors, there exists, in the first plurality of edges, at least one edge between contiguous regions of the unique pair of colors; and
receiving a second test signal representing a second test pattern, wherein the second test signal defines a second plurality of colors that appear in the second test pattern;
causing the first test pattern to be outputted, wherein the outputted first test pattern is generated from the first test signal, and wherein the outputted first test pattern exhibits a third plurality of colors distinct from the first plurality of colors; and
causing the second test pattern to be outputted, wherein the outputted second test pattern is generated from the second test signal, and wherein the outputted second test pattern exhibits a fourth plurality of colors distinct from the second plurality of colors.

18. The method of claim 17 further comprising:
receiving, in response to viewing the outputted first and second test patterns, an adjustment of one or more color processing controls, wherein the adjustment of the one or more color processing controls is intended to reduce an appearance of blinking when the outputted first and second test patterns are viewed in succession under the test condition.

19. The method of claim 17 wherein representations of the first and second test patterns are stored on a non-transitory machine-readable medium.

20. A method for testing the fidelity of color processing, the method comprising:
receiving a first test signal representing a first test pattern, wherein the first test signal defines:
(a) a first plurality of colors that appear in the first test pattern, the first plurality of colors including at least three colors, each of the first plurality of colors including a predetermined primary and filling contiguous regions in the first test pattern, wherein each of the first plurality of colors is a different combination of intensities of primaries that include the predetermined primary;
(b) a first plurality of edges between the contiguous regions of the first plurality of colors in the first test pattern, wherein, for each unique pair of colors in the first plurality of colors, there exists, in the first plurality of edges, at least one edge between contiguous regions of the unique pair of colors; and
(c) a first plurality of zones in the first test pattern, wherein each zone in the first plurality of zones includes a subset of edges in the first plurality of edges, and wherein, for each zone in the first plurality of zones, there exists at least one color in the first plurality of colors that does not appear in the zone; and
causing the first test pattern to be outputted, wherein the outputted first test pattern is generated from the first test signal, and wherein the outputted first test pattern exhibits a second plurality of colors distinct from the first plurality of colors.

21. The method of claim 20 further comprising:
receiving, in response to viewing the outputted first test pattern, an adjustment of a first color processing control, wherein the adjustment of the first color processing control is intended to level out brightness of a first subset of zones in the first plurality of zones when the outputted first test pattern is viewed under the test condition; and
receiving, in response to viewing the outputted first test pattern, an adjustment of a second color processing control, wherein the adjustment of the second color processing control is intended to level out brightness of a second subset of zones in the first plurality of zones when the outputted first test pattern is viewed under the test condition.

22. The method of claim 20 further comprising:
receiving a second test signal representing a second test pattern, wherein the second test signal defines:
(a) a third plurality of colors that appear in the second test pattern;
(b) a second plurality of edges between contiguous regions of colors in the second test pattern; and
(c) a second plurality of zones in the second test pattern, wherein each zone in the second plurality of zones includes a subset of edges in the second plurality of edges, and wherein, for each zone in the second plurality of zones, there exists at least one color in the third plurality of colors that does not appear in the zone, and
causing the second test pattern to be outputted, wherein the outputted second test pattern is generated from the second test signal, and wherein the outputted second test pattern exhibits a fourth plurality of colors distinct from the third plurality of colors, and
wherein the first test pattern and the second test pattern are visually distinct.

23. The method of claim 20, wherein the individual ones of the plurality of colors that appear in the first test pattern is encoded as the same intensity.

24. The method of claim 20, wherein the plurality of colors exhibit uniform brightness when viewed under a test condition in which only the first primary is visible.

25. The method of claim 22 further comprising:
receiving, in response to viewing the outputted first and second test patterns, an adjustment of a first color processing control, wherein the adjustment of the first color processing control is intended to level out brightness of a first subset of zones in the first and second pluralities of zones when the outputted first and second test patterns are viewed in succession under the test condition; and receiving, in response to viewing the outputted first and second test patterns, an adjustment of a second color processing control, wherein the adjustment of the second color processing control is intended to level out brightness of a second subset of zones in the first and second pluralities of zones when the outputted first and second test patterns are viewed in succession under the test condition.

26. An apparatus for testing the fidelity of color processing, the apparatus comprising:

a processing component configured to generate a test signal representing a test pattern, the test signal defining:

(a) a first plurality of colors that appear in the first test pattern, the first plurality of colors including at least three colors, each of the first plurality of colors including a predetermined primary and filling contiguous regions in the first test pattern, wherein each of the first plurality of colors is a different combination of intensities of primaries that include the predetermined primary; and (b) a plurality of the contiguous regions of the plurality of colors in the first test pattern, wherein, for each unique pair of colors in the plurality of colors, there exists, in the plurality of edges, at least one edge between contiguous regions of the unique pair of colors.

27. A non-transitory machine-readable medium, the machine-readable medium having stored thereon a representation of a test pattern, the representation of the test pattern defining:

(a) a plurality of colors that appear in the first test pattern, the plurality of colors including at least three colors, each of the plurality of colors including a predetermined primary and filling contiguous regions in the first test pattern, wherein each of the plurality of colors is a different combination of intensities of primaries that include a first primary the predetermined primary; and (b) a plurality of the contiguous regions of the plurality of colors in the first test pattern, wherein, for each unique pair of colors in the plurality of colors, there exists, in the plurality of edges, at least one edge between contiguous regions of the unique pair of colors.

28. The non-transitory machine-readable medium of claim 27 wherein the machine-readable medium is selected from a group consisting of: DVD, Blu-Ray Disc, HD-DVD, flash memory, and hard disk.

29. The non-transitory machine-readable medium of claim 27 wherein the representation of the test pattern includes a plurality of instructions which, when executed by a processing component, cause the processing component to generate the test pattern.

* * * * *